United States Patent Office 3,425,233
Patented Feb. 4, 1969

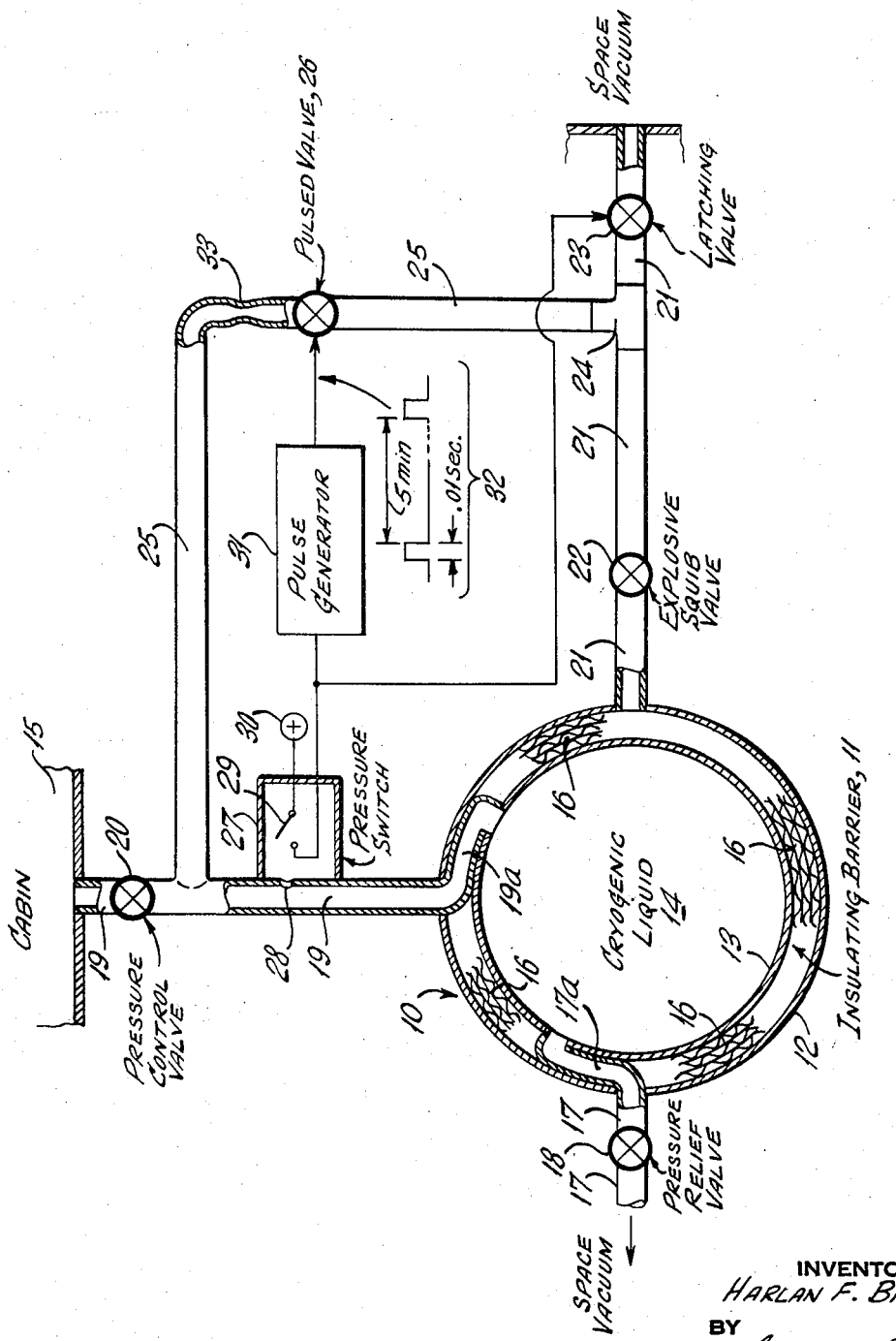

3,425,233
PROCESS AND MEANS FOR REGULATING THE PRESSURE AND FLOW OF A STORED FLUID
Harlan F. Brose, Littleton, Colo., assignor to United Aircraft Corporation, East Hartford, Conn., a corporation of Delaware
Filed Aug. 26, 1966, Ser. No. 575,423
U.S. Cl. 62—45      3 Claims
Int. Cl. F17c 1/12, 7/02; B64g 9/00

ABSTRACT OF THE DISCLOSURE

An insulation barrier in a storage container for a cryogenic fluid or the like has its thermal characteristics deteriorated so as to control the expulsion of the fluid in the container.

This invention relates to processes and means for storing and for regulating the purveyance of cryogenic fluids, and in particular, the invention refers to processes and means for storing cryogenic liquid oxygen and for purveying same at predetermined rates for use in orbiting space vehicles.

The advent of manned-space flights has intensified the development for effective processes and means for storing and purveying cryogenic fluids, for example, liquid oxygen. Among its many uses, liquid oxygen is used to satisfy the needs of orbiting space vehicle inhabitants. Heretofore, the cryogenic fluid has been stored in suitable, tank-like container means well insulated from the inhabitable portion of the space vehicle. The storage tank is thermally insulated to control the rate of "boil-off" of the fluids to prevent excessive consumption or jettison-like exhaust of same. In addition, the storage tank thermal "insulating barrier" also serves to provide proper regulation of the fluid consumption rate.

Accordingly prior art storage systems, whether employed in space vehicles or not, include complex and extremely sensitive regulating and control devices and system means for avoiding both extremely high pressures and excessively low pressures regarding the stored cryogenic fluids. For example, if the fluid storage tank insulation becomes operatively faulty or defective, it is possible for the cryogenic fluid pressure and thus its temperature to rise to dangerously high values thereby creating "explosion conditions." To prevent the creation of "explosion conditions," pressure relief valve safety systems are suitably employed to jettison the high pressure fluid, thereby maintaining the fluid storage pressure below a preselected safe value.

On the other hand, the pressure of the stored fluid as a result of any one of a number of reasons may fall below a tolerable value, for example, when its consumption rate becomes excessive. For such situations, it has been the prior art practice to employ tank heaters to raise the cryogenic fluid temperature and thus its pressure to a tolerable, operable or safe value, as the case may be. The feed rate of the fluid to its load, for example, the space vehicle cabin, is normally a function of a pressure differential between the storage source and the load. Should the storage source pressure fall below a specified value, it may become difficult to extract the cryogenic fluid from its tank for supplying same at an adequate rate to the load for consumption.

To insure an adequate supply of cryogenic fluids at proper or at a specified feed rate, particularly when dealing with liquid oxygen for consumption in space vehicles, the prior art has restored to many control techniques including the use of battery powered heaters and its concomitant regulators. Thin wire heaters are located in thermal contact with the stored fluid to raise the stored fluid temperature and thus its pressure whenever the fluid pressure falls below a specified value. The heaters are turned off when the fluid temperature (or pressure) reaches a desired value. The additional problems created by the heater systems include the reliability of thin heater wiring and the added bulk and weight of the heater battery power equipment. Other problems concern the precautions required to prevent spurious heat leaks into the storage region from the "heater systems wiring" and the added precautions to make certain that all the power is properly consumed from the heater batteries. Spurious heat and power leaks will raise the system temperature and thus the pressure of the stored cryogenic fluid, thereby causing excessive "boil-off" or even actuation of the system safety pressure relief system in the fluid storage system so as to jettison and thus waste the cryogenic fluid. This is a costly waste particularly for space vehicle operations.

The invention claimed herein contemplates cryogenic fluid storage means, in particular for liquid oxygen, wherein the storage means insulating barrier is the "natural phenomenon of perfect space vacuum." The insulating barrier characteristics of a space vacuum is far superior to the vacuum pump insulating barrier of prior art devices. Futhermore, the invention claimed herein contemplates the use of the stored cryogenic fluid as the means for degrading the insulating barrier wherein the insulating characteristics of said barrier is regulated from its "perfect vacuum status" to allow heat exchange flow from the inhabitabe region of the space vehicle through said insulating barrier for the purpose of regulating the pressure of the stored cryogenic fluid. The foregoing processes and means eliminate entirely the prior art concepts of extraneous heating devices, vacuum pump means and concomitant regulating systems therefor. In the invention claimed herein, the stored fluid in operable combination with the heat energy normally available in the inhabitable portion of a space vehicle serve as the heat source and regulating means for controlling the pressure of the stored fluid.

It is a principal object of the inventions herein to provide processes and means for storing and for regulating the purveyance of cryogenic fluids including in particular liquid oxygen for use in orbital space vehicles.

It is a further object of the inventions herein to provide the processes and means for storing and regulating the purveyance of cryogenic fluids, wherein said fluids are stored within an insulation barrier having insulating characteristics adjustable from that of a "perfect vacuum" as constituted by space (space in this sense meaning beyond the earth's atmosphere) to a degraded vacuum brought about by the injection of the stored fluid into the insulating barrier; and in furtherance of said object, the invention contemplates simple and reliable regulating system means for controlling the insulating characteristics of said insulating barrier.

It is a further object of the inventions herein to provide processes and techniques for regulating the temperature of the cryogenic fluid storage means insulating barrier as contemplated hereinabove for the purpose of regulating its pressure by means of using the available heat of surrounding regions as a source of "heater means" wherein heat energy is transmitted through said barrier region in order to regulate the stored fluid pressure under specified conditions once afforded by simple and reliable system instrumentations.

Further objects and advantages will become apparent from the following description of the invention taken in conjunction with the figures, in which:

The figure depicts schematically an illustrative embodiment of the invention claimed herein for storing and supplying cryogenic liquid oxygen.

A cryogenic fluid storage tank 10 in accordance with the invention claimed herein includes an enclosed thermal insulating barrier 11 formed by suitably spaced apart outer and inner spherical walls 12, 13. As known in the art, the structural design for walls 12, 13 depends upon the type of cryogenic fluid stored therein, the circumstances under which said fluid is stored, for example the specified pressures therefor, and the purposes to which the system is intended. For illustrative purposes, the described embodiment contemplates storage of liquid oxygen in the tank area 14 within wall 13 at preselected pressure for purveying gaseous oxygen to the inhabitants in the cabin 15 of an orbiting space vehicle.

Barrier 11 serves to separate and thermally isolate the stored liquid oxygen from the adjacent regions of the space vehicle. Barrier space 11 preferably includes multiple layer superinsulation foils 16 for improving the insulating radiation barrier characteristics of storage tank 10. Storage tank interior 14 is designed to communicate with ambient space (meaning beyond the earth's atmosphere) by means of a conduit 17 which includes a normally closed standby safety pressure relief valve 18. When the tank pressure, that is to say, the pressure of the stored cryogenic liquid rises above a predetermined safe value relief valve 18 opens and jettisons the liquid into space until its pressure falls to a safe value, whereby valve 18 closes.

Liquid storage area 14 communicates with cabin interior 15 for the purpose of purveying the stored oxygen into cabin 15 by means of a conduit 19 which conduit includes a pressure controlled valve 20. Each of the end portions of conduit 17, 19 enter outer shell 12 to communicate with tank region 14 preferably by conduit sections 17a and 19a extending into region 11 and deliberately made long to improve the insulating characteristics of tank 10.

In the illustrative embodiment the pressure of the stored fluid in tank region 14 is maintained within range of 800 to 825 pounds per square inch (p.s.i.); whereas the pressure in cabin 15 is maintained normally within the range of 5 to 15 p.s.i. The foregoing pressure differential between tank region 14 and cabin interior 15 establishes an energy potential differential for effecting oxygen flow at a given flow rate out of tank region 14, through conduit 19 and into cabin 15. The rate of oxygen flow is a function of the pressure differential between its supply source 14 and cabin interior 15. The design of pressure control valve 20 may include means for regulating the rate of oxygen feed into cabin 15 in accordance with well known prior art techniques not shown herein.

The storage system also includes a conduit 21 for connecting barrier region 11 with the ambient space. Conduit 21 includes an "initially closed" explosive squib valve 22 and a "normally open" latching valve 23. The exhaust side of valve 23 connects with ambient space. A connection 24 intermediate valves 22, 23 interconnects conduit 21 with a conduit 25. The other end of conduit 25 connects with cabin feed conduit 19. Conduit 25 includes a "normally closed" pulsed valve 26.

In operation, when the space vehicle is on the ground, i.e., on its launching pad, both explosive squib valve 22 and pulsed valve 26 are closed, whereas latching valve 23 is open. In addition, insulating barrier 11 is pumped by known prior art means to reduce its pressure to a vacuum. The vacuum condition in insulating region 11 is maintained as long as valves 22, 26 are closed. When the vehicle is in space flight beyond the earth's atmosphere, squib valve 22 is opened by an explosive charge. It will be understood that valve 22 is actuated to open status only once and remains open for the remainder of the flight. Upon opening of valve 22, insulating barrier 11 connects with the ambient space via conduit 21. As known in the art, the "vacuum" of natural ambient space beyond the earth's atmosphere is superior as a "vacuum" than the pump vacuum initially established in insulating barrier 11. Accordingly any and all residue gaseous molecules in region 11 exhaust into space via conduit 21 to establish an insulating barrier 11 constituted by the "perfect vacuum of space" and thus a barrier 11 of "perfect thermal insulating" characteristics surrounding storage tank region 14.

As an alternative embodiment, explosive squib valve 22 may be eliminated whereas latching valve 23 is "normally closed" until after the vehicle is in space flight at which time valve 23 is actuated to open to exhaust region 11 to equal the "perfect vacuum" of space.

Recurring to the embodiment including squib valve 22, said valve serves as a pressure relief valve for providing system safety and operative reliability.

A pressure switch 27 of well known conventional design is adapted to respond to the pressure of tank region 14 via a pressure port 28 in conduit 19 as shown herein. When the pressure of tank region 14 falls below a preset value such as 800 p.s.i., switch contact 29 is designed to close; and when the pressure of tank region 14 rises above 825 p.s.i., switch contact 29 is designed to open. The foregoing operation is designed to maintain the pressure of the cryogenic fluid within the described range of 800 to 825 p.s.i. by means of selective opening and closing actuation of pressure switch 27 in response to the aforesaid upper and lower pressure limits. As described hereinafter, during the interval that switch contact 29 is closed, valve 26 is pulsed to open momentarily thus causing a vapor oxygen feed into insulating barrier region 11.

It is preferable that switch 27 respond to two different limit pressure values in contrast to actuating same in response to a single value of pressure. Operation in response to a single pressure value might render the system unstable by causing spurious oscillations which are not suitable for reliable and accurate orbiting space vehicle operation. Tank system 10 includes a power supply 30 electrically connected to operate a pulse generator 31 when switch contact 29 is in closed status. Generator 31 is designed to supply a series of 0.01 second output pulses at five minute intervals as depicted at 32. The precise time intervals used herein are only illustrative examples of a short "on" time and a relatively long "off" time operation. Other time values are feasible.

Source 30 also connects directly to latching valve 23 by means of line 33. When switch contact 29 remains in closed status, the normally open latching valve 23 is actuated to remain in closed status. Hence it will be understood from the foregoing arrangement, normally open valve 23 is maintained closed as long as contact 29 is closed. The output of generator 31 via connecting line 34 feeds to an actuator of pulsed valve 26, whereby the latter valve 26 is designed to open for each 0.01 second interval of the generator signal.

It will be recalled that latching valve 21 is normally open. Assume for the purpose of illustrating system operation that the stored fluid pressure is between 800 and 825 p.s.i. when the space vehicle first enters outer space flight. Squib valve 22 is exploded to open status. Barrier region 11 becomes completely evacuated due to exhaust into the ambient space. Any existing slight heat flow from cabin 15 into storage region 14 is offset by the consumption of oxygen from region 14, whereby the liquid oxygen pressure in region 14 normally fluctuates within the specified range. The disclosed system is generally stabilized by its operating equilibrium between 800 and 825 p.s.i. For example, fluid pressure drops slightly with oxygen consumption, but such pressure increases with heat flow into tank region 14. As oxygen passes valve 20, it enters the relatively low pressure region 15 and vaporizes.

Should the liquid oxygen pressure drop below the tolerable lower limit of 800 p.s.i., this is sensed by switch 27 to close contact 29. A pressure drop may be due to a sudden purveyance of oxygen through valve 20, for example, one of the astronauts leaves cabin 15 for a "space walk." Source 30 is now connected to latching valve 28; the latter is actuated to close thereby isolating region 11 from the ambient space. At the same time 0.01 second actuating pulses are fed to pulse valve 26 thereby opening same for a series of 0.01 second spaced by five-minute intervals.

Each time valve 26 opens, oxygen under high pressure is fed into barrier region 11 via conduit 19, conduit 25, through valve 26, T-connection 24 and valve 22 so as to degrade the insulation properties of barrier 11. The burst of fed oxygen creates an oxygen vapor in the low pressure barrier region 11 thereby increasing its thermal conduction and convection properties, whereby heat energy flows through barrier 11 and into tank region 14. Ultimately the pressure in region 14 rises. After a five-minute interval, a second burst of oxygen is fed into barrier 11 as hereinbefore described with the result in a further rise in stored cryogenic liquid pressure. The foregoing creates a situation of small perceptible increases in cryogenic liquid pressure. The pressure increase is normally not excessive, particularly since it is being offset by oxygen consumption in cabin 15.

Contact 29 opens when the pressure of tank region 14 rises above the range of 825 p.s.i. A compensation operation for excessive pressure is as follows. When the cryogenic liquid pressure in region 14 rises above 825 p.s.i., contact 29 opens whereby generator 31 shuts off to return valve 26 to its normally closed status and valve 23 to its normally open status. The excessively high pressure may be the result of an under consumption of oxygen in cabin 15. The foregoing valve regulation effects a direct connection between insulating barrier 11 and ambient space thus resulting in evacuation of region 11 to achieve the "perfect space vacuum" therein. The thermal insulating properties of barrier 11 now become "near perfect" with the concomitant result of suppressing heat energy flow through barrier 11 and into region 14 to achieve the ultimate result of decreasing the pressure therein. The pressure rise is further arrested by the fact that there is still some oxygen drawn off via valve for consumption in cabin 15. This status continues until cryogenic storage region 14 falls below the critical 800 p.s.i. to achieve a compensation operation as previously described.

The direction of flow through valves 20 and 26 are from the high potential pressure sides to the low potential pressure sides thereof. The rates of fluid flow through valves 20 and 26 are determined by numerous factors. As seen hereinbefore switch contact 29 alternatively opens and closes to achieve system regulation. It has been found that the disclosed system characteristics are such that switch contact 29 changes its position only a few times during an orbital flow which may encompass a number of days.

The rate of flow of oxygen from storage source 14 through conduits 19, 25, and 21 into insulating barrier 11 may be regulated further, if desired, by selecting a pulse valve 26 constructed to pass less and less oxygen to region 11 for each successive 0.01 second pulse. In addition conduit 25 may be constricted at 33 also to arrest excessive feed of oxygen into region 11.

It is intended that all matter contained in the above description or shown in the accompanying drawing shall be interpreted as illustrative and not in a limiting sense.

What is claimed is:

1. Apparatus for regulating the pressure and flow of a stored cryogenic fluid comprising, means for storing the cryogenic fluid at a specified pressure, barrier means for insulating thermally said stored fluid from adjacent regions having temperature levels higher than said stored fluid, means for regulating the pressure of said stored fluid to maintain same within a prescribed range of pressure, said last-mentioned means including means for introducing preselected amounts of said stored fluid into said insulating barrier means for regulating the thermal insulating properties thereof, the negation of the insulating properties of said barrier means allowing a heat exchange through said barrier means and between a region of higher temperature and said storing means for regulating the pressure of said fluid, wherein said regulating means including, a fluid conduit between said storing means and said barrier means for conveying said fluid therebetween and including valve means, a signal control for operating said valve, and means for sensing the pressure of said stored fluid for actuating said signal control means when said fluid pressure deviates from a given value for operating said valve to effect an exchange of fluid between said storing means and said barrier means.

2. Apparatus for regulating the pressure and flow of a stored cryogenic fluid comprising, means for storing the cryogenic fluid at a specified pressure, barrier means for insulating thermally said stored fluid from adjacent regions having temperature levels higher than said stored fluid, means for regulating the pressure of said stored fluid to maintain same within a prescribed range of pressure, said last-mentioned means including means for introducing preselected amounts of said stored fluid into said insulating barrier means for regulating the thermal insulating properties thereof, the negation of the insulating properties of said barrier means allowing a heat exchange through said barrier means and between a region of higher temperature and said storing means for regulating the pressure of said fluid, means for preselectedly connecting said insulating barrier means with the space vacuum beyond the earth's atmosphere for regulating the insulating properties of said insulating barrier means to achieve a nearly perfect thermal insulating barrier for thermally isolating said stored fluid from said adjacent regions, for regulating the flow of a cryogenic fluid in a space vehicle wherein said regulating means including, fluid conduit means for connecting said storing means to said barrier means and for connecting said barrier means to the ambient space vacuum, said conduit means including individual valve means for regulating the fluid flow therealong, signal control means for selectively operating said valve means, and means for sensing the pressure of said stored fluid for actuating said signal control means when:

(a) said fluid pressure deviates in one sense from given pressure values to effect an exchange of fluid from said storing means to said barrier means, and (b) also for blocking said last-mentioned fluid exchange and for connecting said barrier means to said space vacuum when said stored fluid pressure deivates from said given pressure values in an opposite sense.

3. Apparatus for regulating the pressure and flow of a stored cryogenic fluid comprising, means for storing the cryogenic fluid at a specified pressure, barrier means for thermally insulating said stored fluid from adjacent regions of higher temperature levels, and means for preselectedly connecting said insulating barrier means with the space vacuum beyond the earth's atmosphere for regulating the insulating properties of said insulating barrier to afford a nearly perfect thermally insulating barrier for thermally isolating said stored fluid from said adjacent regions, for regulating the flow of a cryogenic fluid in a space vehicle wherein said regulating means including fluid conduit means for connecting said storing means to said barrier means and for connecting said barrier means to the ambient space vacuum, said conduit means including individual valve means for regulating the fluid flow therealong, signal control means for selectively operating said valve means, and means for sensing the pressure of said stored fluid for actuating said signal control means when:

(a) said fluid pressure deviates in one sense from given pressure values to effect an exchange of fluid from said storage means to said barrier means, and (b) also for blocking said last-mentioned fluid exchange and for exhausting said barrier means to said space vacuum when said stored fluid pressure deviates from said given pressure values in an opposite sense.

References Cited

UNITED STATES PATENTS

| 1,876,047 | 9/1932 | Edmonds | 62—50 |
| 3,114,469 | 12/1963 | Francis et al. | 62—45 X |
| 3,130,561 | 4/1964 | Hnilicka | 62—45 X |

LLOYD L. KING, *Primary Examiner.*

U.S. Cl. X.R.

62—55.5, 268